US008223767B2

(12) United States Patent
Nanda et al.

(10) Patent No.: US 8,223,767 B2
(45) Date of Patent: Jul. 17, 2012

(54) DRIVEN MULTICAST TRAFFIC DISTRIBUTION ON LINK-AGGREGATE-GROUP

(75) Inventors: Avoy K. Nanda, Milpitas, CA (US); Kunal R. Shah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 371 days.

(21) Appl. No.: 12/651,256

(22) Filed: Dec. 31, 2009

(65) Prior Publication Data
US 2011/0158113 A1 Jun. 30, 2011

(51) Int. Cl.
*H04L 12/56* (2006.01)
(52) U.S. Cl. ........................................................ 370/390
(58) Field of Classification Search .................. 370/252, 370/312, 351, 390, 396, 395.21–395.52, 370/400, 401, 422, 428
See application file for complete search history.

(56) References Cited

U.S. PATENT DOCUMENTS

| 6,553,029 | B1* | 4/2003 | Alexander | ..................... 370/389 |
| 7,668,081 | B2* | 2/2010 | Hermsmeyer et al. | ........ 370/218 |
| 7,983,166 | B2* | 7/2011 | Liu et al. | ........................ 370/235 |
| 8,014,394 | B2* | 9/2011 | Ram et al. | ...................... 370/390 |
| 2008/0291919 | A1* | 11/2008 | Dunbar et al. | ............. 370/395.3 |

* cited by examiner

*Primary Examiner* — Frank Duong
(74) *Attorney, Agent, or Firm* — Blakely Sokoloff Taylor & Zafman, LLP (57) ABSTRACT

A method and apparatus of dynamically distributing multicast stream to different hosts on a link-aggregation-group is described. A network element receives, on a link-aggregation-group, multicast requests and determines the bandwidth for that request by the information stored in the request. The network element further allocates bandwidth requirement on the least utilized link in link-aggregation-group. The network element additionally updates a forwarding table to indicate that the multicast stream in that request is to be forward out the allocated link.

20 Claims, 6 Drawing Sheets

DRIVEN MULTICAST TRAFFIC DISTRIBUTION ON LINK-AGGREGATE-GROUP

BACKGROUND

1. Field

Embodiments of the invention relate to the field of processing network traffic; and more specifically, to a dynamic mechanism to achieve distribution of multicast traffic on available active links of a link-aggregate-group.

2. Background

A link-aggregate-group (LAG) provides higher bandwidth between network nodes by combining multiple links onto a logical link. For example, eight-gigabit Ethernet links between two network nodes can be grouped into one eight-gigabit link. This grouping of links into a logical link increases the redundancy, reliability, and resiliency of the network. Of the multiple links that are available in the LAG, some of the links are active and forward traffic while the other links are standby for failover. Due to the availability of multiple active links, traffic can be transmitted on the active links.

One challenge is how a network element distributes traffic on the active links. Current implementations of distribute traffic on a LAG in a number of ways. (1) Irrespective of bandwidth need for a traffic stream, a network element chooses any active link to forward traffic by hashing on source and group address of the traffic stream or chooses links in a round robin fashion. (2) The network element statically configures bandwidth for each stream in the node, such that when a request comes for a traffic stream, the network element looks up the active link assigned to the requested traffic stream. (3) The network element calculates bandwidth utilization on each active link by adding byte stream of each packet forwarded on that link. (4) Alternatively, the network element keeps loading an active link with all streams until its bandwidth exhausts then move onto the next link.

Each of the existing ways described above have disadvantages. Choosing an active link based on hash or in round robin fashion can overload some active links and leave others underutilized. Statically configuring links requires administrative intervention with bandwidth requirements for a traffic stream changes. On the fly calculation of bandwidth utilization by adding bytes is very central processing unit (CPU) intensive. Loading one active link can cause more traffic interruption when that link goes down causing all the traffic streams to be moved to another active link. Where as distributing traffic over all available active links will cause less streams to be affected when an active link goes down.

SUMMARY

A method and apparatus of dynamically distributing multicast streams to different hosts on a link-aggregation-group is described. A network element receives, on a link-aggregation-group, multicast requests and determines the bandwidth for that request by the information stored in the request. The network element further allocates bandwidth requirement on the least utilized link in link-aggregation-group. The network element additionally updates a forwarding table to indicate that the multicast stream in that request is to be forward out the allocated link.

In one embodiment, the method operates by receiving a multicast request that requests to join one of the multicast streams from the different hosts, where the multicast request includes a type code that indicates a type of the requested multicast stream. The method further determines a bandwidth amount for the one of the multicast streams using the type code contained in the requested multicast request. The method allocates the bandwidth amount on one of the links in the link-aggregate-group. In response to a successful allocation, the method updates a forwarding table to indicate that the requested multicast stream is to be forwarded on the one of the links.

In another embodiment, a network comprises a service provider, a plurality of hosts, a link-aggregation-group, a first network element and a second network element. The service providers provide a plurality of multicast streams. Each of the plurality of hosts transmits a multicast request that requests to join one of a plurality of multicast streams and each of the plurality of multicast requests includes a type code that indicates a type of the requested multicast stream. The link-aggregation-group comprises a plurality of links. The second network element is coupled to the plurality of hosts and provides multicast access to the plurality of hosts.

The first network element is coupled to the second network element via the link-aggregation-group and distributes the plurality of multicast streams to the plurality of hosts on the link-aggregate-group. The first network element is further coupled to the service provider. In addition, the first network element comprises an input component, a bandwidth determination component, a link bandwidth allocation component, and a forwarding table component. The input component receives the plurality of multicast requests from the plurality of hosts. The bandwidth determination component, for each of the plurality of multicast requests received, determines a bandwidth amount for one of the plurality of multicast streams using the type code contained in that multicast request. The link bandwidth allocation component, for each of the plurality of multicast requests received, allocates the bandwidth amount corresponding to the type code in that multicast request on one of the plurality of links. The forwarding table component, in response to a successful allocation of the bandwidth amount and for each of the plurality of multicast requests received, updates a forwarding table to indicate that one of the plurality of multicast streams in that multicast request is to be forwarded on the one of the plurality of links.

In another embodiment, a network element is adapted to dynamically distribute a plurality of multicast streams to a plurality of hosts on a link-aggregation-group between a first network element and a second network element. The plurality of hosts is coupled to the second network element and the link-aggregation-group includes a plurality of links coupling the second network element and the first network element.

The network element comprises an input component, a bandwidth determination component, a link bandwidth allocation component, and a forwarding table component. The input component is to receive the plurality of multicast requests from the plurality of hosts. The bandwidth determination component, for each of the plurality of multicast requests received, is to determine a bandwidth amount for one of the plurality of multicast streams using the type code contained in that multicast request. The link bandwidth allocation component, for each of the plurality of multicast requests received, is to allocate the bandwidth amount corresponding to the type code in that multicast request on one of the plurality of links. The forwarding table component, in response to a successful allocation of the bandwidth amount and for each of the plurality of multicast requests received, is to update a forwarding table to indicate that one of the plurality of multicast streams in that multicast request is to be forwarded on the one of the plurality of links.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for dynamically distributing multicast stream to different hosts on a link-aggregation-group. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, router with a border gateway function, media gateway, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, palm tops, mobile phones, smartphones, multimedia phones, Voice Over Internet Protocol (VoIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

In addition, a network element can have border gateway functionality. A distributed session border controller (SBC) system includes a signaling SBC (S-SBC) and a data SBC (D-SBC). The S-SBC controls the opening, closing, and policing of traffic flows through the D-SBC through a standard interface (e.g., the Ia interface defined by ETSI (European Telecommunications Standards Institute) TISPAN (Telecommunications and Internet converged Services and Protocols for Advanced Networking) which uses the H.248 control protocol ("Gateway control protocol: Version 3", ITU-T Recommendation H.248.1, September 2005). H.248 messages are transmitted between the S-SBC and the D-SBC. In 3GPP (3rd Generation Partnership project) IMS (IP multimedia subsystem) architecture, D-SBC is also referred to as BGF (Border gateway function).

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

A method and apparatus of dynamically distributing multicast stream to different hosts on a link-aggregation-group is described. A network element receives, on a link-aggregation-group, multicast requests and determines the bandwidth for that request by the information stored in the request. The network element further allocates bandwidth requirement on the least utilized link in link-aggregation-group. The network element additionally updates a forwarding table to indicate that the multicast stream in that request is to be forward out the allocated link.

Figure 1:
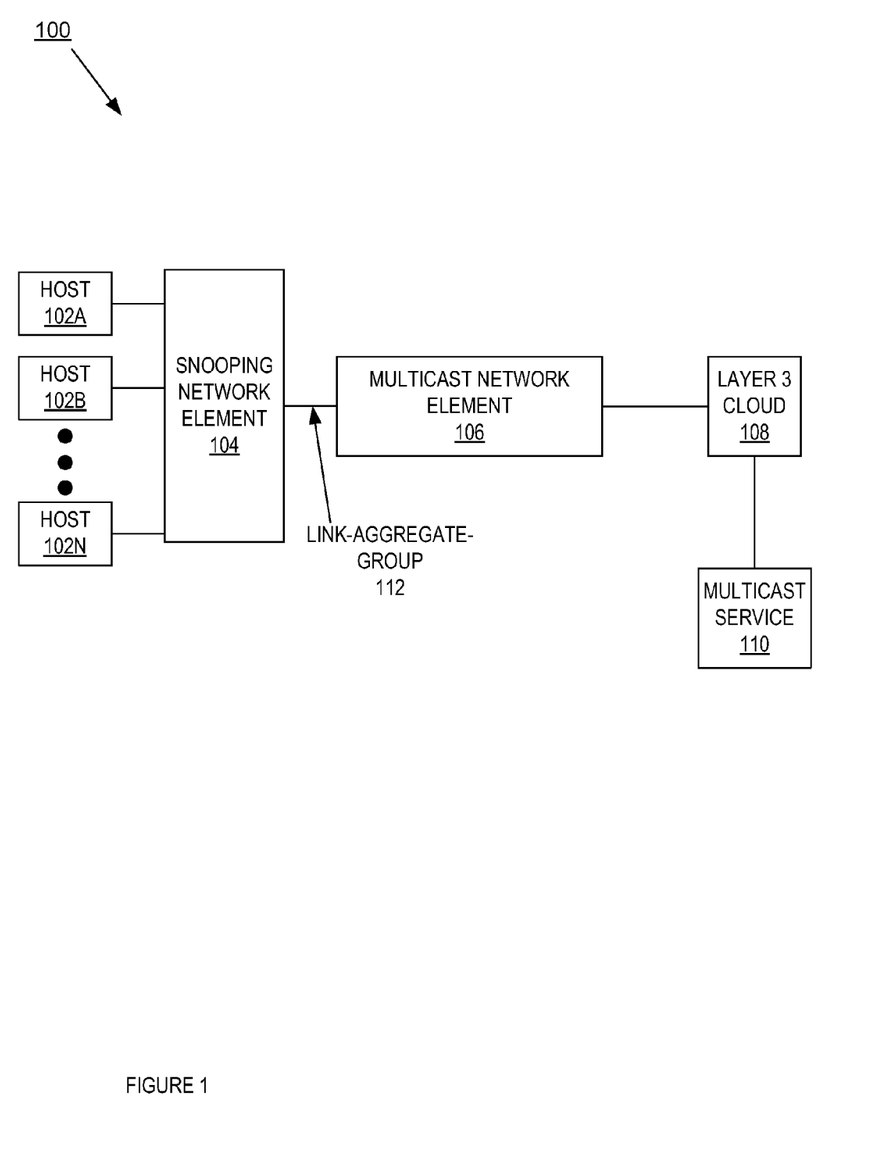
FIG. 1 illustrates a network that provides multicast service to a plurality of hosts according to one embodiment of the invention.

FIG. 1 illustrates a network 100 that provides multicast service to a plurality of hosts according to one embodiment of the invention. In FIG. 1, network 100 comprises hosts 102A-N that coupled to snooping network element 104. In one embodiment, each of the hosts 102A-N is a subscriber end station as described above that is configured to receive multicast service, such as a set top box, personal computer, mobile phone, etc. The snooping network element 104 is further coupled to multicast network element 106, which is further coupled to a multicast service 110 via layer 3 cloud 108. In one embodiment, snooping network element 104 provides multicast access to the hosts 102A-N. Furthermore, snooping network element 104 is coupled to multicast network element 106 via a link-aggregation-group (LAG) 112. As in known in the art, a LAG uses multiple network cables/ports/links in parallel to increase the link speed beyond the limits of one single cable or port, and to increase redundancy for higher availability. For example and in one embodiment, LAG 112 comprises two or more links between snooping network element 104 and multicast network element 106. While in one embodiment each link is a gigabit Ethernet link, in alternate embodiments, the link can be another type of link (10/100 Ethernet, 10 Gbs Ethernet, optical, etc. or other link known in the art). In one embodiment, LAG comprises eight one-gigabit Ethernet links. Furthermore, while in the illustrated embodiment, one LAG is illustrated, in alternate embodiment, there could be other LAGs in the network 100. Layer 3 cloud 108 is a network cloud that forwards traffic using the layer 3 information contained in the data packets being forwarded.

Multicast service 110 provides a multicast service to hosts 102A-N. While in one embodiment, the multicast service is multicast video service (standard definition video, high definition video, picture-in-picture video, etc.), in alternate embodiments, the multicast service can be a different multicast service (audio, webcasts, another multicast service known in the art, and/or combination thereof). Furthermore, the multicast service can transported using be a protocol as known in the art (Motion Pictures Experts Group (MPEG)-1, MPEG-2, MPEG-4, h.264, Advanced Video Compression, etc.) to transport multicast data. Snooping network element 104 and multicast network element can either, or both, be a network element that is multicast aware, such as a multicast router, multicast aware switch, etc.

For the hosts 102A-N to receive the multicast service from multicast service 110, each of the hosts 102A-N makes a request to receive the multicast service. In an alternate embodiment, hosts 102A-N make requests for video-on-demand service. In one embodiment, the request is a multicast request to join a multicast group. This can be an Internet Group Management Protocol (IGMP) report, Multicast Listener Directory (MLD), Protocol Independent Multicast (PIM) join, etc., or other type of request to join a multicast group as known in the art. Multicast service 110 and/or another network element upstream (e.g., multicast network element 106) receives the multicast request from hosts 102A-N and starts forwarding the multicast stream of traffic to the requesting host. Because LAG 112 can have multiple active links available to transport the multicast service to the requesting host, multicast network element 106 has a choice on which of the active links to transport the multicast traffic that is indicated in the requested multicast service.

In one embodiment, multicast network element 106 chooses the active link to transport the requested multicast stream based on the information contained in the multicast request. In this embodiment, multicast network element 106 receives a multicast request from one of the hosts 102A-N. The received multicast request includes a field identifying the multicast group and another field that identifies the type of multicast traffic associated with the multicast group being requested. This type can indicate the multicast group is a standard definition multicast service, a high definition multicast service, a picture-in-picture multicast service, etc. For example, and in one embodiment, the received multicast request is to join multicast group 239.255.255.255. In this embodiment, the received multicast request includes a field that indicates that this multicast group is a high definition video stream. For example and in one embodiment, the multicast request is an IGMP/MLD report and the type field is stored in the first four bits of the message. In one embodiment, an IGMP/MLD report uses the "Reserved" field (1 byte) for "Bandwidth Type" that hosts or network elements will fill in to indicate the bandwidth requirement for the requested traffic. In another embodiment, the type information is stored in the first four bytes of the Encoded Group Address field. In a further embodiment, these fields are renamed to "Bandwidth Requirement" and have the following values: 0x0 for standard definition (default behavior), 0x1 for high definition, and 0x2 for picture-in-picture.

In response to receiving the multicast request, multicast network element 106 determines which active link of LAG 112 will transport the requested multicast traffic stream. In one embodiment, multicast network element 106 chooses an active link based on the type information and the current load on the active links in the LAG 112. In this embodiment, multicast network element 106 extracts the type information from the multicast request and determines which active link has the least bandwidth utilization in LAG 112. Multicast network element 106 determines if the link with the least utilized bandwidth has enough bandwidth to handle the requested multicast traffic stream. If there is enough bandwidth on that link, multicast network element 106 updates the utilized bandwidth with the amount indicated by the multicast type and updates a multicast forward table to indicate that the requested multicast traffic stream is to be forwarded of the selected active link. In addition, multicast network element 106 transmits a multicast join message to another network element upstream for the requested multicast traffic stream. In one embodiment, in the multicast join message, the multicast network element 106 can indicate the bandwidth requirement for the stream and an upstream router can use this information can use choose an active link to forward the multicast traffic stream if the upstream router(s) are coupled with another LAG. Further discussion of how the multicast network element 106 dynamically distributing multicast stream to different hosts on a link-aggregation-group is described in FIG. 3 below.

In one embodiment, the hosts 102A-N transmit a layer 2 multicast request (e.g., an IGMP/MLD report) towards the snooping network element 104. In this embodiment, the snooping network element 104 is a multicast aware switch that forwards received traffic based on the layer 2 information in the received traffic. The snooping network element receives the layer 2 multicast requests from the hosts 102A-N and forward these layer 2 requests to the multicast network element 106 via LAG 112. The multicast network element 106 receives the layer 2 multicast requests and distributes the traffic streams for the corresponding multicast groups in the layer 2 multicast requests. In one embodiment, the multicast network element 106 dynamically distributes the multicast groups using the type information contained in the layer 2 multicast requests as described above and in FIG. 3 below. Furthermore, for each multicast request that results in a successful allocation on one of the active links in the LAG 112, the multicast network element 106 transmits a layer 3 multicast request (e.g. PIM join) upstream to another network element.

Figure 2:
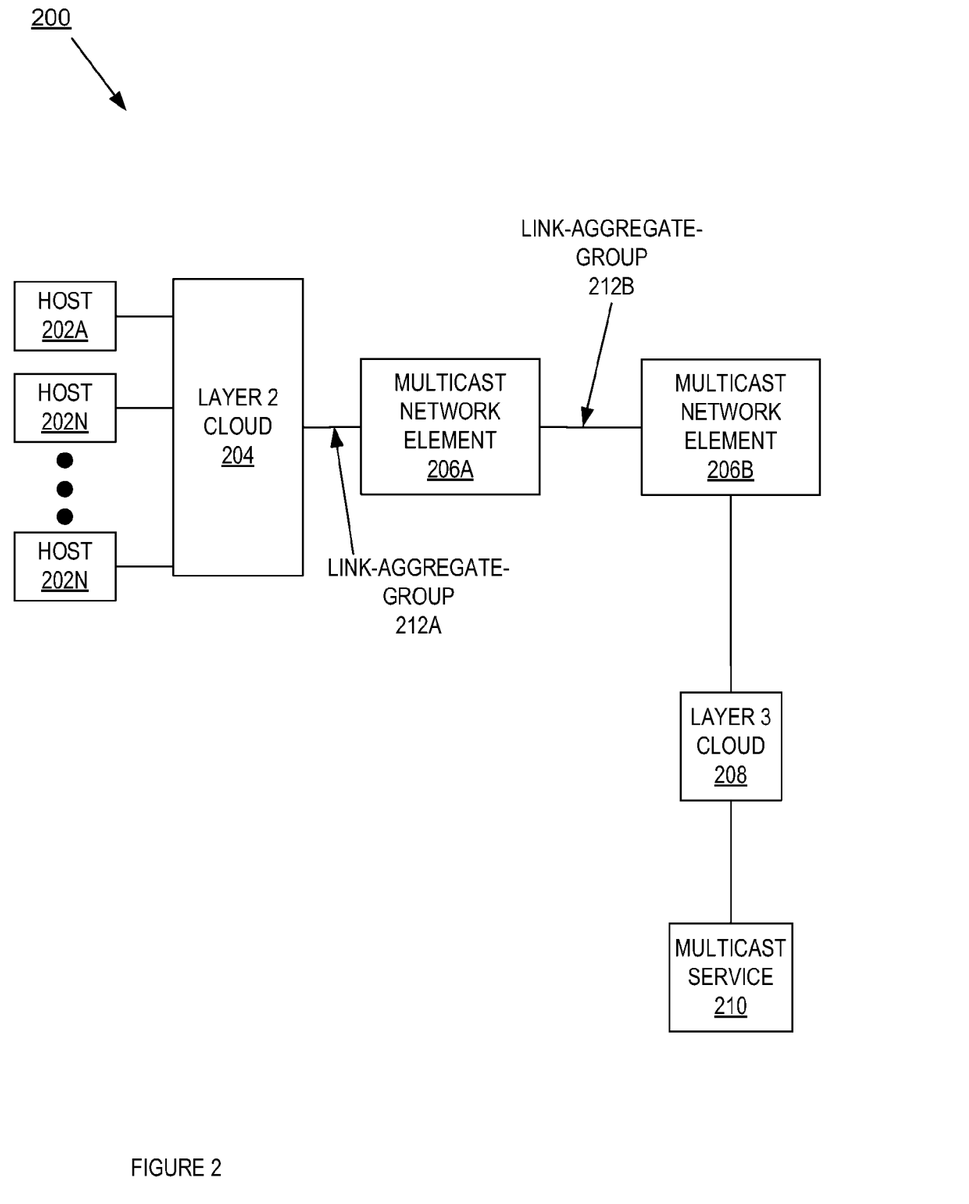
FIG. 2 illustrates a network that provides multicast service to a plurality of hosts with cascading multicast network elements according to one embodiment of the invention.

In FIG. 1, one LAG was illustrated coupling a snooping network element and a multicast network element. As mentioned in the description of FIG. 1, multiple LAGs can be employed in the network. FIG. 2 illustrates a network 200 that provides multicast service to a plurality of hosts 102A-N with cascading multicast network elements according to one embodiment of the invention. In FIG. 2, hosts 202A-N are coupled to multicast network element 206A via layer 2 cloud 204 and LAG 212A. Multicast network element 206A further couples to multicast network element 206B via LAG 212B. Multicast network element 206B is coupled to multicast service via layer 3 cloud 208.

As in FIG. 1, each of the hosts 202A-N transmit a multicast request to receive the service to multicast service, such as an IGMP/MLD report, PIM join, etc., though the layer 3 cloud to the multicast network element 206A. In one embodiment, each of the multicast requests include a field that indicates the type multicast traffic stream being requested (high definition, standard definition, etc.) as described above with reference to FIG. 1, above. In addition, multicast network element 206A receives the multicast requests and determines which link in LAG 212A will transmit that requested multicast stream as described above in FIG. 1. Multicast network element 206A further transmits a multicast request (e.g., PIM join, etc.) upstream to multicast network element 206B via LAG 212B. In this embodiment, this multicast request from multicast network element 206A also includes a type field to indicate a type of multicast traffic stream. Multicast network element 206B receives the multicast requests from multicast network element 206A and uses the type field in the requests to determine which link in LAG 212B to use for the requested multicast traffic stream. Further discussion of how the multicast network elements 206A-B dynamically distribute multicast streams to different hosts on a link-aggregation-group is described in FIG. 3 below.

Figure 3:
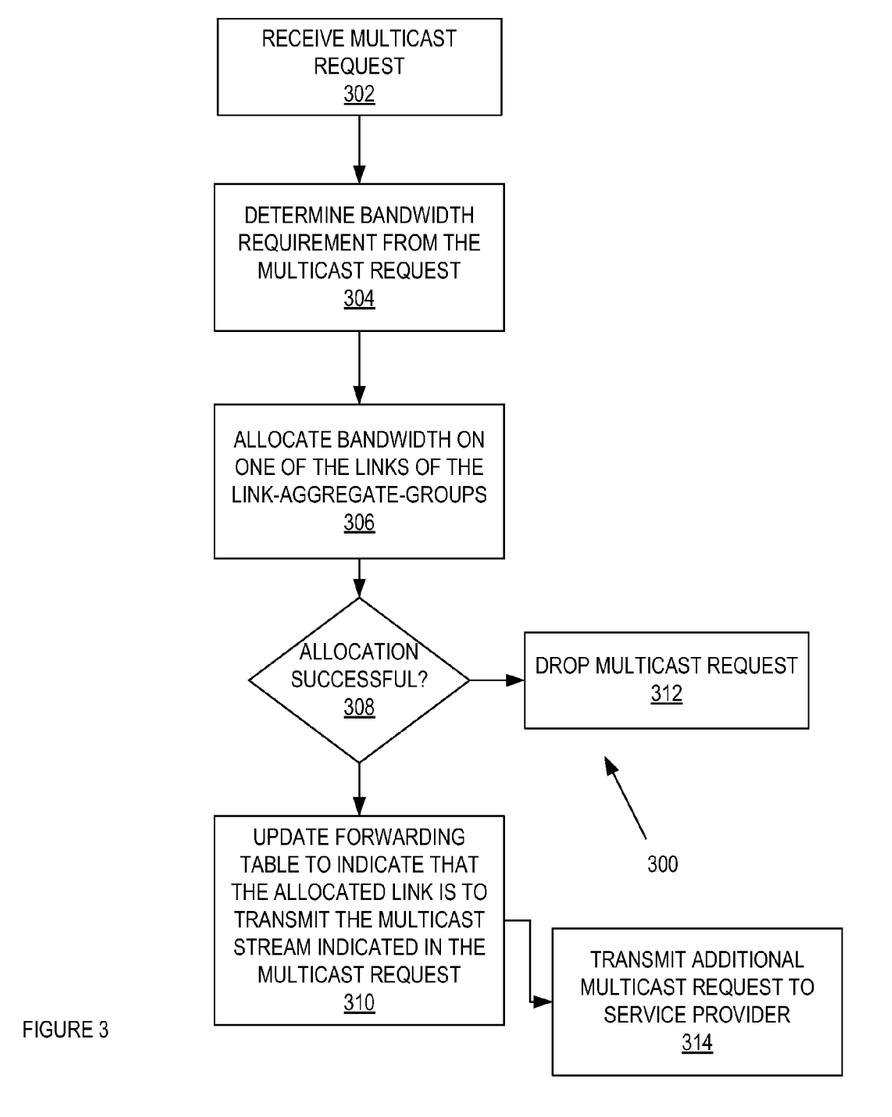
FIG. 3 illustrates an exemplary flow diagram of dynamically distributing multicast stream to different hosts on a link-aggregation-group according to one embodiment of the invention.

FIG. 3 illustrates an exemplary flow diagram of a process 300 dynamically distributing multicast stream to different hosts on a link-aggregation-group according to one embodiment of the invention. In FIG. 3, process 300 receives a multicast request at block 302. In one embodiment, process 300 receives a multicast request that includes a type field that indicates the type of multicast traffic stream as described above. For example and in one embodiment, the type field in the received multicast request can indicate that the requested multicast traffic stream is a high definition, standard definition, picture-in-picture, etc. data stream.

At block 304, process 300 determines the bandwidth requirement from the received multicast request. In one embodiment, process 300 extracts the data within the type field of the multicast request to determine the bandwidth requirement. For example and in one embodiment, a type field value of 0x0 indicates a standard definition, 0x1 indicates high definition, and 0x2 indicates a picture-in-picture multicast data streams. In this example, a standard definition multicast data stream can be a 5 Mbps stream, a high definition multicast data stream can be a 10 Mbps stream, and a picture-in-picture definition multicast data stream is a stream less than 1 Mbps.

Process 300 allocates bandwidth on one of active links of a LAG using the bandwidth requirement determined above at block 306. In one embodiment, process 300 allocates the bandwidth on one of the active links by determining which of the active links has the least amount of allocated bandwidth and allocates the required bandwidth on that link. Allocating bandwidth on one of the active links is described further in FIG. 4 below.

At block 308, process 300 determines if the allocation was successful. If the allocation was not successful, process 300 drops the multicast request at block 312. In one embodiment, process 300 drops the multicast request and does not transmit an additional multicast request to an upstream multicast network element.

If the allocation was successful, process 300 updates a forwarding table to indicate that the allocated link is to transmit the requested multicast stream indicated in the received multicast request at block 310. In one embodiment, process 300 adds an entry in a forwarding table, where the entry indicates that the requested multicast stream is to be forwarded on the allocated link. At block 314, process 300 transmits additional an additional multicast request to a multicast network element that is upstream from the network element running process 300. For example and in one embodiment, process 300 transmits a multicast join message to another network element upstream for the requested multicast traffic stream as described in FIG. 1 above.

Figure 4:
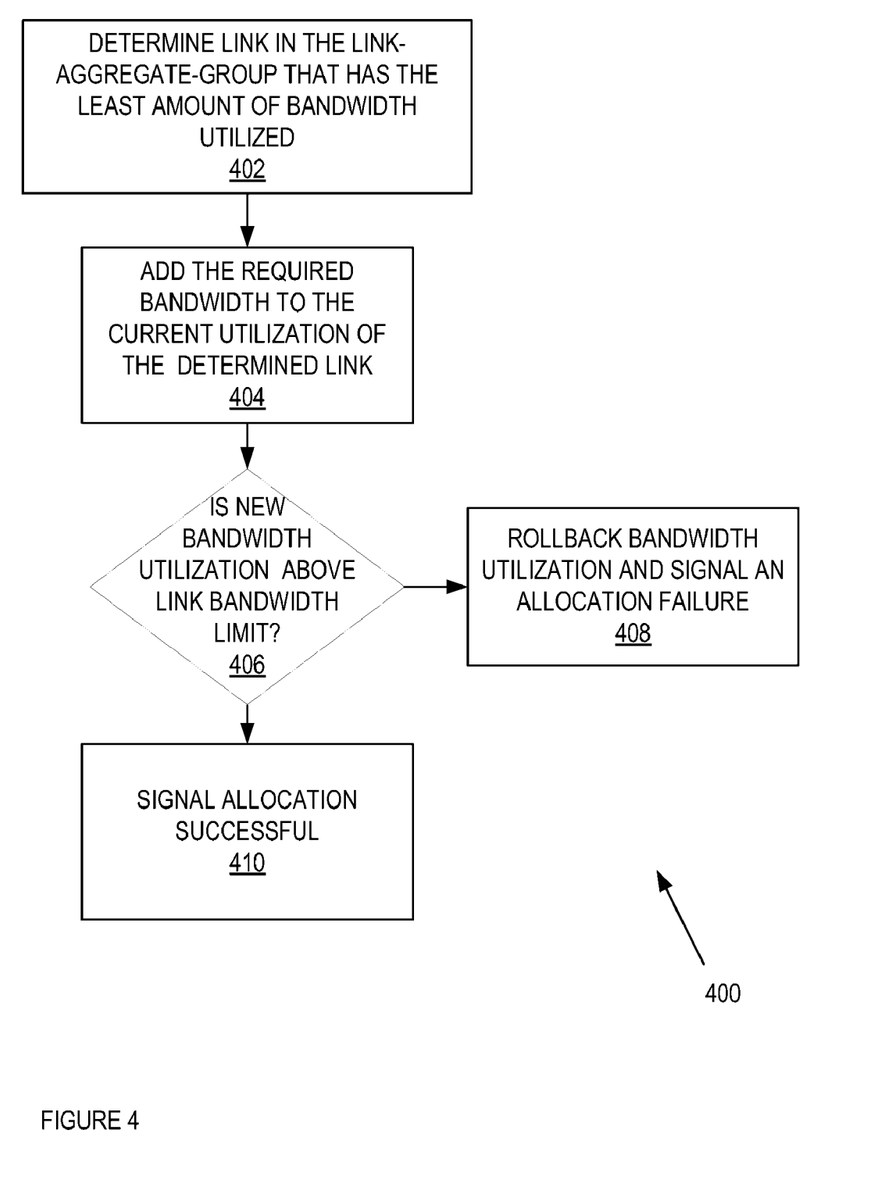
FIG. 4 illustrates an exemplary flow diagram of allocating a link in a link-aggregation-group for a multicast stream according to one embodiment of the invention.

FIG. 4 illustrates an exemplary flow diagram of a process 400 of allocating a link in a link-aggregation-group for a multicast stream according to one embodiment of the invention. In one embodiment, process 400 is executed by process 300 at block 306 above. In FIG. 4, process 400 determines the link in the LAG that has the least amount of bandwidth utilized at block 402. In one embodiment, utilized bandwidth is actual amount utilized on each link. In this embodiment, the links in an LAG would have same capacity. At block 404, process 400 adds the needed bandwidth to the current utilization of the determined link. Process 400 determines if the new bandwidth utilization is above the link bandwidth limit at block 406. If so, process 400 rolls back the bandwidth utilization and signals an allocation failure at block 408. If the new bandwidth is at or below the link bandwidth limit, process 400 signals that the allocation is successful at block 410.

Figure 5A:
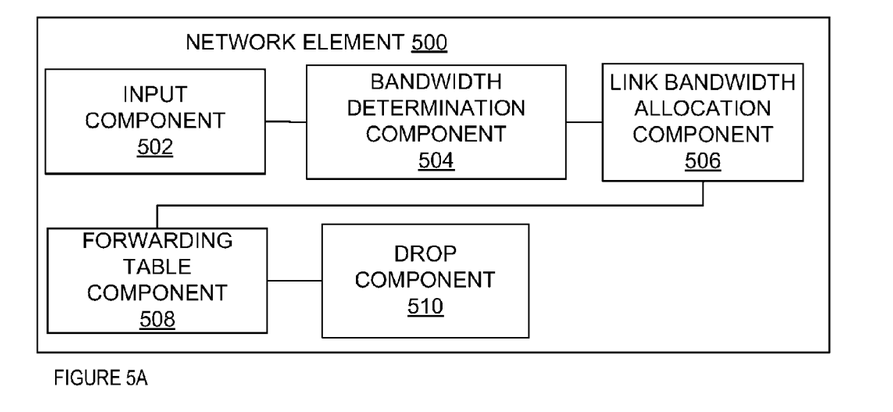
FIG. 5A is a block diagram illustrating an exemplary network element that can distribute a multicast stream as used in FIG. 1 according to one embodiment of the invention.

FIG. 5A is a block diagram illustrating an exemplary network element 500 that can distribute a multicast stream as used in FIG. 1 according to one embodiment of the invention. In one embodiment, network element 500 is a multicast aware network element such as multicast network element 106 in FIG. 1 or multicast network elements 206A-B in FIG. 2 above. Network element 500 comprises input component 502, bandwidth determination component 504, link bandwidth component 506, forwarding table component 508, and drop component 510. Input component 502 receives the multicast request from one of the hosts as described in FIG. 3, block 302. Bandwidth determination component 504 determines bandwidth requirement from the received multicast request as described in FIG. 3, block 304. Link bandwidth allocation component 506 allocates the bandwidth on one of the links as described in FIG. 3, block 306. Forwarding table component 508 updates the forwarding table as described in FIG. 3, block 308. Drop component 510 drops the multicast as described in FIG. 3, block 310.

Figure 5B:
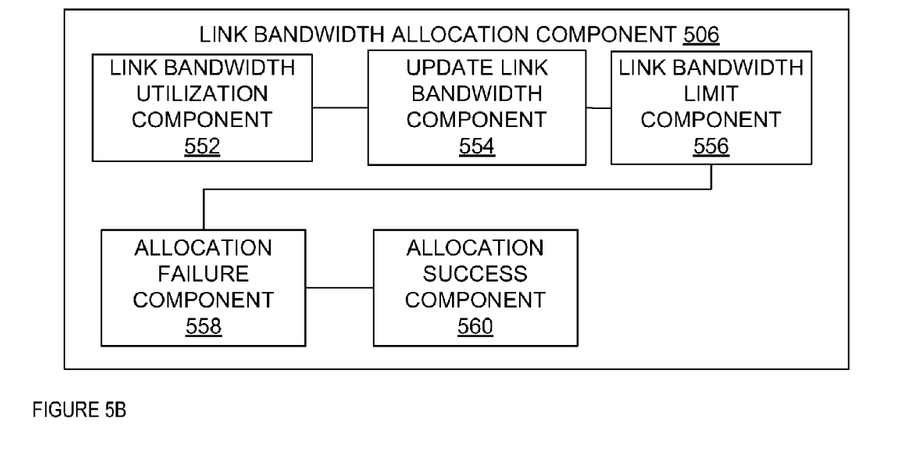
FIG. 5B is a block diagram illustrating an exemplary link bandwidth allocation component as used in FIG. 5A according to one embodiment of the invention.

FIG. 5B is a block diagram illustrating an exemplary link bandwidth allocation component 506 as used in FIG. 5A according to one embodiment of the invention. In FIG. 5B, link bandwidth allocation component 506 comprises link bandwidth utilization component 552, update link bandwidth component 554, link bandwidth limit component 556, allocation failure component 558, and allocation success component 560. Link bandwidth utilization component 552 determines the link with least amount of bandwidth is utilized as described in FIG. 4, block 402. Update link bandwidth component 554 adds the required bandwidth to the determined link as described in FIG. 4, block 404. Link bandwidth limit component 556 determines if the new bandwidth utilization above the link bandwidth limit as described in FIG. 4, block 406. Allocation failure component 558 rolls back the bandwidth utilization and signal an allocation failure as described in FIG. 4, block 408. Allocation success component 560 signal a successful allocation as described in FIG. 4, block 410.

Figure 6:
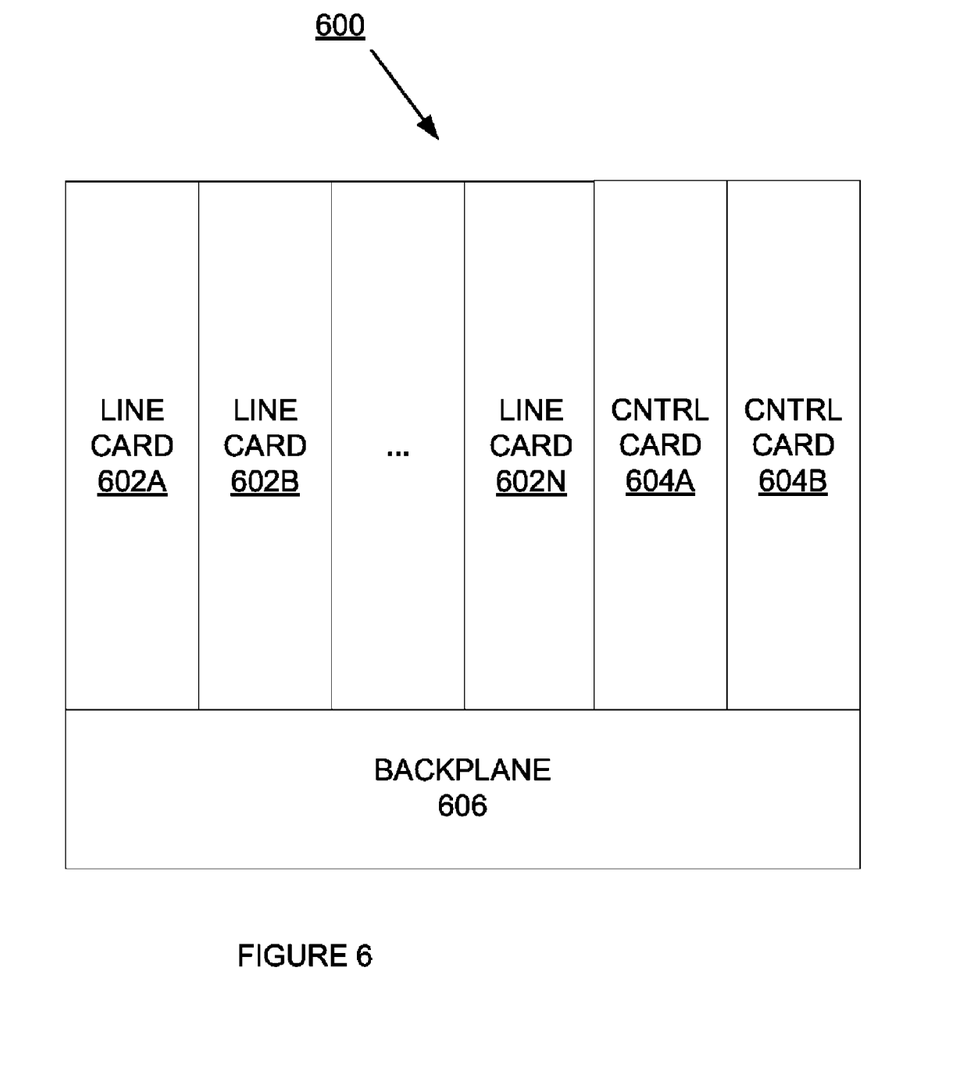
FIG. 6 is a block diagram illustrating an exemplary network element comprising line cards and control card(s) that that can distribute a multicast stream as used in FIG. 1 according to one embodiment of the system.

FIG. 6 is a block diagram illustrating an exemplary network element comprising line cards and control card(s) that that can dynamically distribute a multicast stream as used in FIG. 1 according to one embodiment of the system. In FIG. 6, backplane 606 couples to line cards 602A-N and controller cards 604A-B. While in one embodiment, controller cards 604A-B control the processing of the traffic by line cards 602A-N, in alternate embodiments, controller cards 604A-B perform the same and/or different functions (dynamically distributing multicast streams on a LAG, etc.). Line cards 602A-N process and forward traffic according to the policies received from controller cards 604A-B. In one embodiment, line cards 602A-N forward multicast packets as described in FIGS. 1-4. In another embodiment, line cards 602A-N receives multicast request packets as described in FIG. 3 at block 302. It should be understood that the architecture of the network element 600 illustrated in FIG. 6 is exemplary, and different combinations of cards may be used in other embodiments of the invention.

Alternative Embodiments

The embodiments illustrated for dynamically distributing multicast streams have been shown with respect to a network element such as a router or switch. However, embodiments of the invention are not limited to dynamically distributing multicast streams with one router or switch. Alternative embodiment may have the link bandwidth allocation component performed in a separate network element or device. Such an embodiment could be implemented by having the multicast request receiving and multicast packet forwarding performed by one network element and the other network element forwarding packets.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of distributing a plurality of multicast streams to a plurality of hosts on a link-aggregation-group between a first network element and a second network element, wherein the plurality of hosts are coupled to the second network element and the link-aggregation-group includes a plurality of links coupling the second network element and the first network element, the method comprising the steps of:
   receiving, with the first network element, a multicast request that requests to join one of the plurality of multicast streams from one of the plurality of hosts, wherein the multicast request includes a type code that indicates a type of the requested multicast stream;
   determining a bandwidth amount for the one of the plurality of multicast streams using the type code contained in the requested multicast request;
   allocating the bandwidth amount on one of the plurality of links; and
   in response to a successful allocation of the bandwidth amount, updating a forwarding table to indicate that the requested one of the plurality of multicast streams is to be forwarded on the one of the plurality of links.

2. The method of claim 1, wherein the step of allocating comprises the steps of:
   determining that the one of the plurality of links has the least bandwidth utilized out of the plurality of links; and,
   adding the bandwidth amount to the one of the plurality of links to correct the bandwidth utilization of that link.

3. The method of claim 1, wherein a multicast stream is selected from a group consisting of a high definition multimedia stream, a standard definition multimedia stream, and a picture-in-picture multimedia stream.

4. The method of claim 1, wherein a first multicast request is selected from a group consisting of an Internet Group Management Protocol report, a Protocol Independent Multicast join, and a Multicast Listener Directory report.

5. The method of claim 1, wherein the first network element is selected from a group consisting of a multicast snooping switch and a multicast router.

6. The method of claim 1, wherein the method further includes the step of:
   dropping the first multicast request if the step of allocating of the bandwidth is not successful.

7. The method of claim 1, wherein the method further includes the step of:
   in response to a successful allocation of the bandwidth amount, transmitting a second multicast request to a service provider.

8. The method of claim 1, wherein the first multicast request is one of an Internet Group Management Protocol report and a Multicast Listener Directory report and the second multicast request is a Protocol Independent Multicast join.

9. The method of claim 1, wherein the first multicast request is one of an Internet Group Management Protocol report and a Multicast Listener Directory report and the type code is stored in the reserved checksum field of the first multicast request.

10. The method of claim 1, wherein the first multicast request is Protocol Independent Multicast join and the type code is stored in the first four bytes of the encoded address field of the first multicast request.

11. A network comprising:
   a service provider that provides a plurality of multicast streams;
   a plurality of hosts, wherein each of the plurality of hosts transmits a multicast request that requests to join one of a plurality of multicast streams and each of the plurality of multicast requests includes a type code that indicates a type of the requested multicast stream;
   a link-aggregation-group that comprises a plurality of links;
   a second network element, coupled to the plurality of hosts that provides multicast access to the plurality of hosts; and
   a first network element, coupled to the second network element and the service provider, wherein the first network element is coupled to the second network element via the link-aggregation-group, and the first network element to dynamically distribute the plurality of multicast streams to the plurality of hosts on the link-aggregate-group, the first network element comprising,
      an input component, wherein the input component receives the plurality of multicast requests from the plurality of hosts,
      a bandwidth determination component, coupled to the input component, wherein the bandwidth determination component, for each of the plurality of multicast requests received, determines a bandwidth amount for one of the plurality of multicast streams using the type code contained in that multicast request,
      a link bandwidth allocation component, coupled to the bandwidth determination component, wherein the link bandwidth allocation component, for each of the plurality of multicast requests received, allocates the bandwidth amount corresponding to the type code in that multicast request on one of the plurality of links, and,
      a forwarding table component coupled to the link bandwidth allocation component, wherein the forwarding table component, in response to a successful allocation of the bandwidth amount and for each of the plurality of multicast requests received, updates a forwarding table to indicate that one of the plurality of multicast streams in that multicast request is to be forwarded on the one of the plurality of links.

12. The network of claim 11, wherein the link bandwidth allocation component, for each of the received multicast requests, also:
   determines that the one of the plurality of links has the least bandwidth utilized out of the plurality of links; and
   adds the bandwidth amount to the one of the plurality of links to correct the bandwidth utilization of that link.

13. The network of claim 11, wherein a multicast stream is selected from a group consisting of a high definition multimedia stream, a standard definition multimedia stream, and a picture-in-picture multimedia stream.

14. The network of claim 11, wherein a first multicast request is selected from a group consisting of an Internet Group Management Protocol report, a Protocol Independent Multicast join, and a Multicast Listener Directory report.

15. The network of claim 11, wherein the first network element is selected from a group consisting of a multicast snooping switch and a multicast router.

16. The network of claim 11, wherein the network element further includes:
   a drop component, wherein the drop component drops the first multicast request if the step of allocating of the bandwidth is not successful.

17. The network of claim 11, wherein the first multicast request is one of an Internet Group Management Protocol report and a Multicast Listener Directory report and the type code is stored in the reserved checksum field of the first multicast request.

18. The network of claim 11, wherein the first multicast request is Protocol Independent Multicast join and the type code is stored in the first four bytes of the encoded address field of the first multicast request.

19. A network element adapted to dynamically distribute a plurality of multicast streams to a plurality of hosts on a link-aggregation-group between a first network element and a second network element, wherein the plurality of hosts are coupled to the second network element and the link-aggregation-group includes a plurality of links coupling the second network element and the first network element, the network element comprising:
   an input component to receive a multicast request that requests to join one of the plurality of multicast streams from one of the plurality of hosts, wherein the multicast request includes a type code that indicates a type of the requested multicast stream;
   a bandwidth determination component to determine a bandwidth amount for the requested multicast stream using the type code contained in the multicast request;
   a link bandwidth allocation component to allocate the bandwidth amount on one of the plurality of links; and,
   a forwarding table component to, in response to a successful allocation of the bandwidth amount, update a forwarding table to indicate that requested multicast stream is to be forwarded on the one of the plurality of links.

20. The network element of claim 19, wherein the link bandwidth allocation component, is further to:
   determine that the one of the plurality of links has the least bandwidth utilized out of the plurality of links; and
   add the bandwidth amount to the one of the plurality of links to correct the bandwidth utilization of that link.

* * * * *

UNITED STATES PATENT AND TRADEMARK OFFICE
CERTIFICATE OF CORRECTION

PATENT NO. : 8,223,767 B2
APPLICATION NO. : 12/651256
DATED : July 17, 2012
INVENTOR(S) : Nanda et al.

Page 1 of 1

It is certified that error appears in the above-identified patent and that said Letters Patent is hereby corrected as shown below:

In Column 8, Line 36, delete "layer 3" and insert -- layer 2 --, therefor.

Signed and Sealed this
Second Day of October, 2012

David J. Kappos
*Director of the United States Patent and Trademark Office*